(12) United States Patent
Shi et al.

(10) Patent No.: US 10,405,392 B1
(45) Date of Patent: Sep. 3, 2019

(54) DIMMER MULTI-FIRE TO INCREASE DIRECT AC LED DEVICE EFFICIENCY

(71) Applicant: DIALOG SEMICONDUCTOR INC., Campbell, CA (US)

(72) Inventors: Nan Shi, Campbell, CA (US); Haiju Li, Campbell, CA (US)

(73) Assignee: DIALOG SEMICONDUCTOR INC., Campbell, CA (US)

( * ) Notice: Subject to any disclaimer, the term of this patent is extended or adjusted under 35 U.S.C. 154(b) by 0 days.

(21) Appl. No.: 15/954,554

(22) Filed: Apr. 16, 2018

(51) Int. Cl.
*H05B 33/08* (2006.01)

(52) U.S. Cl.
CPC .............................. *H05B 33/0848* (2013.01)

(58) Field of Classification Search
CPC .... H05B 33/02; H05B 33/08; H05B 33/0803; H05B 33/0806; H05B 33/0842; H05B 33/0848; H05B 37/02; H05B 37/0209; H05B 37/0281
See application file for complete search history.

(56) References Cited

U.S. PATENT DOCUMENTS

| | | | | |
|---|---|---|---|---|
| 8,937,435 B1* | 1/2015 | Sutardja | ............ | H05B 33/0815 315/219 |
| 9,559,675 B1* | 1/2017 | Peng | ............ | H03K 5/086 |
| 9,692,316 B1* | 6/2017 | Ryu | ............ | H05B 33/0815 |
| 2011/0140622 A1* | 6/2011 | Suzuki | ............ | H05B 33/0809 315/224 |
| 2011/0291583 A1* | 12/2011 | Shen | ............ | H05B 33/0815 315/287 |
| 2013/0113375 A1* | 5/2013 | Leung | ............ | H05B 33/0815 315/85 |
| 2013/0229121 A1* | 9/2013 | Otake | ............ | H05B 33/0815 315/200 R |
| 2013/0342122 A1* | 12/2013 | Sawada | ............ | H03K 17/51 315/200 R |
| 2014/0159616 A1* | 6/2014 | Wang | ............ | H05B 33/0848 315/307 |
| 2016/0081151 A1* | 3/2016 | Wang | ............ | H05B 33/0818 315/186 |
| 2016/0219662 A1* | 7/2016 | Ho | ............ | H05B 33/0848 |
| 2017/0196062 A1* | 7/2017 | Wang | ............ | H05B 33/0815 |
| 2018/0115234 A1* | 4/2018 | Liu | ............ | H02M 1/00 |
| 2018/0139816 A1* | 5/2018 | Liu | ............ | H05B 33/0845 |
| 2018/0184490 A1* | 6/2018 | Ido | ............ | H05B 33/0824 |

* cited by examiner

*Primary Examiner* — Jason Crawford
(74) *Attorney, Agent, or Firm* — Haynes and Boone LLP (57) ABSTRACT

A direct AC LED lighting device is provided with a controller that switches off a bleeder circuit following an initial rising edge for a post diode bridge voltage. The controller measures a first delay between a zero crossing for the post diode bridge voltage and the initial rising edge to estimate a triggering voltage for a leading edge dimmer switch. The controller determines a second delay following the initial rising edge responsive to the estimate of the triggering voltage. The controller may thus switch on the bleeder circuit at an expiration of the second delay so that bleeder circuit is only on for a duration sufficient to develop a voltage difference across the leading edge dimmer switch to equal the triggering voltage just as the post diode bridge voltage satisfies an LED threshold voltage.

15 Claims, 7 Drawing Sheets

DIMMER MULTI-FIRE TO INCREASE DIRECT AC LED DEVICE EFFICIENCY

TECHNICAL FIELD

This application relates to direct AC LED lighting devices, and more particularly to a direct AC LED lighting device with increased efficiency through dimmer multi-fire.

BACKGROUND

The replacement of incandescent bulbs by light emitting diode (LED) lighting devices reduces energy consumption due to the high efficiency of LED devices as compared to incandescent bulbs. But an incandescent bulb may be directly driven by the AC mains in contrast to conventional LED devices. It is thus conventional for an LED device to include a switching power converter such as a flyback converter to provide a regulated DC current for driving the LED. This need for a switching power converter raises costs and thus diminishes a consumer's desire to switch to LED devices. A consumer may thus continue to use incandescent bulbs, which contributes to global warming due to the increased greenhouse gas emissions from the resulting energy consumption.

To lower LED device costs, direct AC LED devices (which may also be denoted as direct AC LED bulbs) have been developed that obviate the need for a switching power converter. In a direct AC LED device, the AC mains voltage is rectified through a rectifier such as a bridge diode rectifier to produce a rectified AC input voltage. The LED in a direct AC LED device is directly driven by the rectified AC input voltage. Although no switching power converter is thus needed to convert the rectified AC input voltage into a regulated DC current/voltage, a direct AC LED device still needs a controller to control the LED power. In particular, the controller controls an LED current source in series with the LED. When the rectified AC input voltage (which may also be denoted as a post diode bridge voltage) rises above the LED threshold voltage for the LED, the controller controls the LED current by controlling the LED current source so that the LED power may be controlled accordingly.

Figure 1:
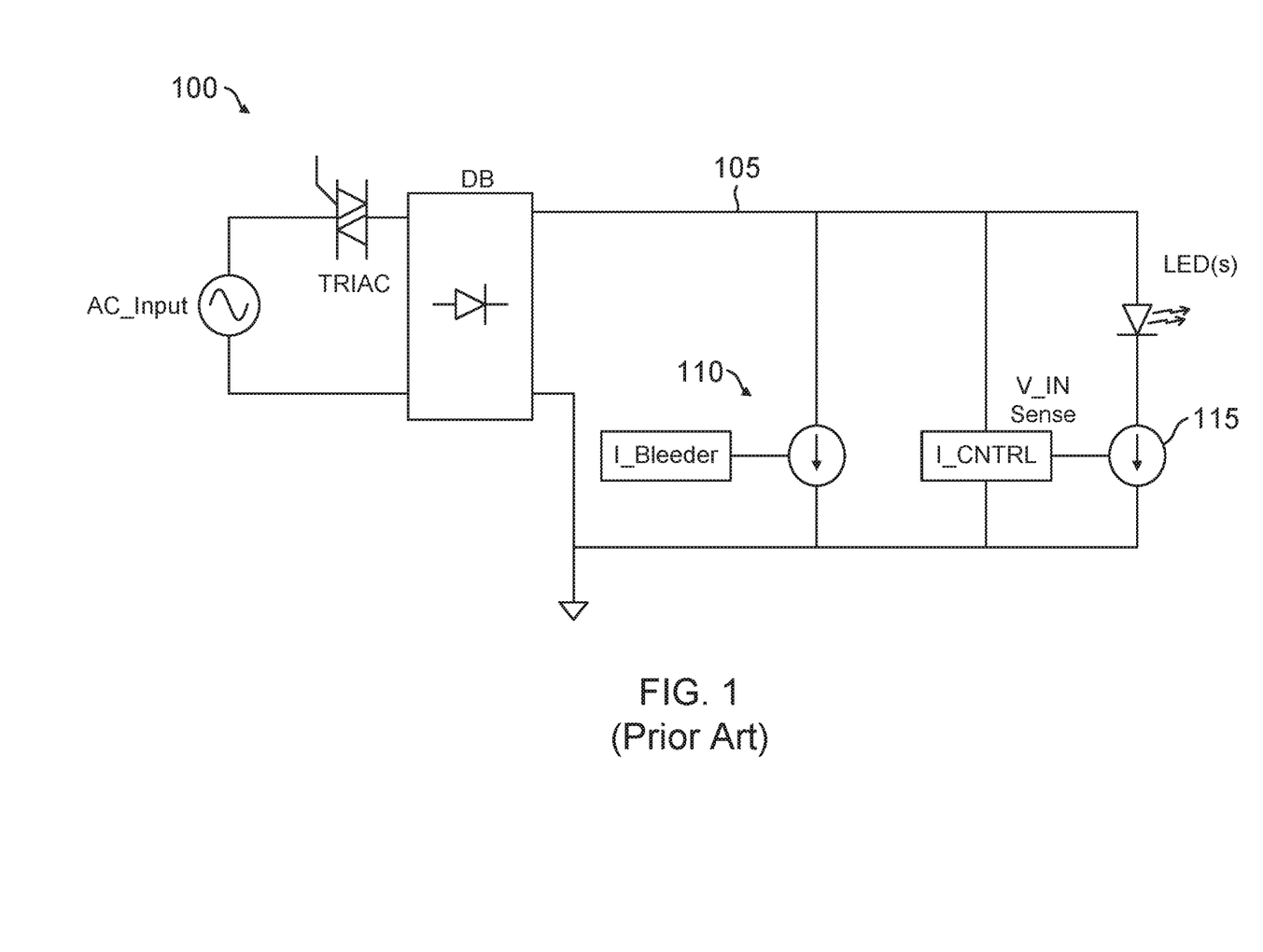
FIG. 1 illustrates a conventional direct AC LED lighting device system including a leading edge (LE) dimmer switch.

The presence of a phase-cut dimmer switch such as a leading edge dimmer switch in household applications complicates the control of direct AC LED lighting devices. In particular, the TRIAC in a leading edge dimmer switch requires a minimum amount of holding current when conducting to prevent the TRIAC from resetting. But the post diode bridge voltage may not have exceeded the LED threshold voltage when the TRIAC begins conducting. A direct AC LED lighting device 100 that is compatible with leading edge dimming applications thus will typically include a bleeder circuit 110 as shown in FIG. 1. A dimmer switch is represented by a TRIAC that intervenes between an AC mains (AC_Input) and a diode bridge (DB). The diode bridge rectifies a phase-cut AC input from the TRIAC to produce the post diode bridge voltage carried on a power rail 105. Bleeder circuit 110 couples to power rail 105 to conduct a holding current into ground. A controller (I_CNTRL) controls a current through an LED string by controlling an LED current source 115.

Bleeder circuit 110 includes a controller (I_Bleeder) that controls the bleed current. In particular, the controller switches a bleeder circuit current source that conducts a bleed current from power rail 105 to ground while the TRIAC is conducting and the LED is not conducting. In a leading edge dimmer switch, the phase angle over which it does not conduct begins at the front edge (zero crossing) of each half cycle for the AC input voltage. Each half cycle of the post diode bridge voltage will have a phase cut portion in which the leading edge dimmer switch does not conduct depending upon the dimmer switch setting by the user. Outside of the phase cut portion in each half cycle, the post diode bridge voltage will behave normally so that it follows a sinusoidal profile from each zero crossing of the post diode bridge voltage. In particular, the post diode bridge voltage from a leading edge dimmer switch will have a rising edge following the phase cut portion. From this rising edge, the post diode bridge voltage will continue sinusoidally increasing until it reaches the LED threshold voltage. At that point, the LED will conduct the minimum holding current to prevent the TRIAC from resetting. The bleeder controller thus may control the bleeder current source to conduct only while the TRIAC conducts and the LED is not conducting.

Figure 2:
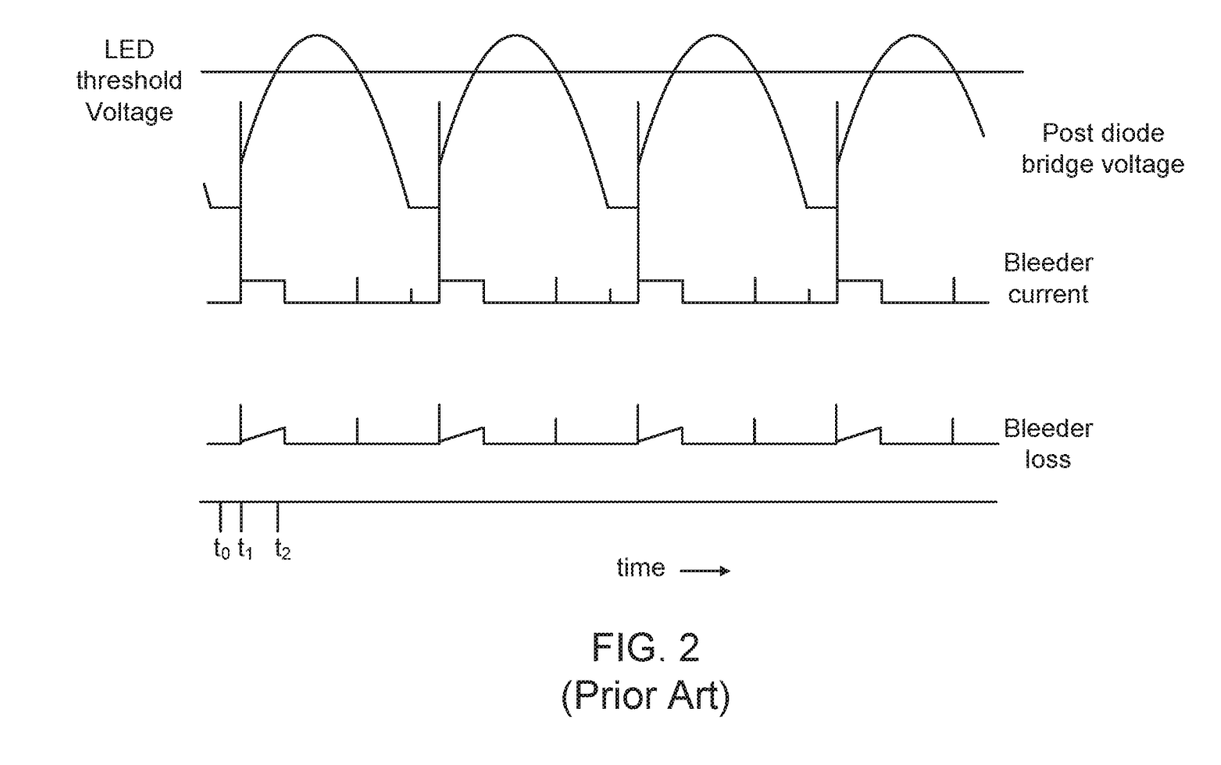
FIG. 2 illustrates the post diode bridge voltage, bleeder current, and bleeder circuit loss waveforms for the conventional direct AC LED lighting device of FIG. 1.

The resulting bleeder current waveform as a function of the post diode bridge voltage waveform is shown in FIG. 2. In each half cycle of the post diode bridge voltage, the LED of FIG. 1 will not conduct until the post diode bridge voltage exceeds the LED threshold voltage. Each half cycle starts from a zero crossing point such as time t0 for an initial half cycle. The TRIAC of FIG. 1 does not conduct until its phase cut portion has expired such as at time t1. From time t0 to t1, the post diode bridge voltage is thus discharged. At time t1, the rising edge of the post diode bridge voltage is passed due to the TRIAC beginning to conduct. The bleeder current must thus flow from time t1 until a time t2 when the LED threshold voltage is satisfied.

Accordingly, there is a need in the art for direct AC LED devices with reduced jitter bleeder current losses in the presence of a phase-cut dimmer switch.

SUMMARY

A direct AC LED lighting device is provided with a controller that switches off the bleeder circuit in response to an initial rising edge of the post diode bridge voltage following its zero crossing. A TRIAC in a leading edge dimmer switch thus resets and does not conduct following the initial rising edge of the post diode bridge voltage. The controller then switches on the bleeder circuit to begin a discharge period for the post diode bridge voltage. The controller times this switch on time for the bleeder circuit so that an RC circuit voltage for a DIAC circuit within the leading edge dimmer switch is charged to its triggering voltage as the post diode bridge voltage satisfies an LED threshold voltage. The bleeder circuit thus produces a bleeder circuit power loss only during the discharge period for the post diode bridge voltage following the initial rising edge for the post diode bridge voltage.

These advantageous features may be better appreciated through a consideration of the following detailed description.

BRIEF DESCRIPTION OF THE DRAWINGS

FIG. 3 illustrates a direct AC LED lighting device system including an LE dimmer switch in accordance with an aspect of the disclosure.

Embodiments of the present disclosure and their advantages are best understood by referring to the detailed description that follows. It should be appreciated that like reference numerals are used to identify like elements illustrated in one or more of the figures.

DETAILED DESCRIPTION

An improved direct AC LED lighting device is disclosed having a controller that maintains the bleeder circuit on for a leading edge dimmer switch after the zero crossing for the post diode bridge voltage until the rising edge for the post diode bridge voltage is detected. This rising edge occurs after a sufficient triggering voltage developed across the TRIAC in the leading edge dimmer switch. The TRIAC then switches on, which causes the rising edge in the post diode bridge voltage. In response to this rising edge, the controller switches off the bleeder circuit. With the bleeder circuit off and no longer maintaining the minimum holding current for the TRIAC, the TRIAC resets and no longer conducts. Although the post diode bridge voltage is then floating, it continues to sinusoidally rise in response to the sinusoidal increase of the AC mains voltage because of the coupling through the internal capacitance of the TRIAC. Since the post diode bridge voltage is following the AC mains voltage, there is essentially no voltage across the TRIAC so long as post diode bridge voltage continues to rise in sync with the AC mains voltage increase (or decrease since the post diode bridge voltage is rectified with respect to the AC mains voltage). Thus, the TRIAC will remain off.

To increase LED efficiency, the controller maintains the bleeder circuit off for a delay period and then again turns the bleeder circuit on. Since the TRIAC is off at this retriggering of the bleeder circuit, the post diode bridge voltage is then discharged for a discharge period. A voltage difference between the AC mains voltage and the post diode bridge voltage then develops, which triggers the TRIAC to again conduct. The post diode bridge voltage will thus have another rising edge after the discharge period and will rise over the LED threshold voltage. The controller may then switch off the bleeder circuit since the LED current will maintain the minimum holding current for the TRIAC. With regard to triggering the TRIAC to conduct, the triggering requires a capacitor in a DIAC within the leading edge dimmer switch to be charged to a triggering or threshold voltage. The capacitor forms an RC circuit with a variable resistor whose resistance is controlled by the user with regard to the desired dimming setting. The triggering of the TRIAC thus requires a certain amount of charge to flow into the the RC circuit. To increase LED efficiency, the controller thus determines the discharge period timing so that the charging of the RC circuit will be completed just before the post diode bridge voltage has reached the LED threshold voltage.

Figure 3:
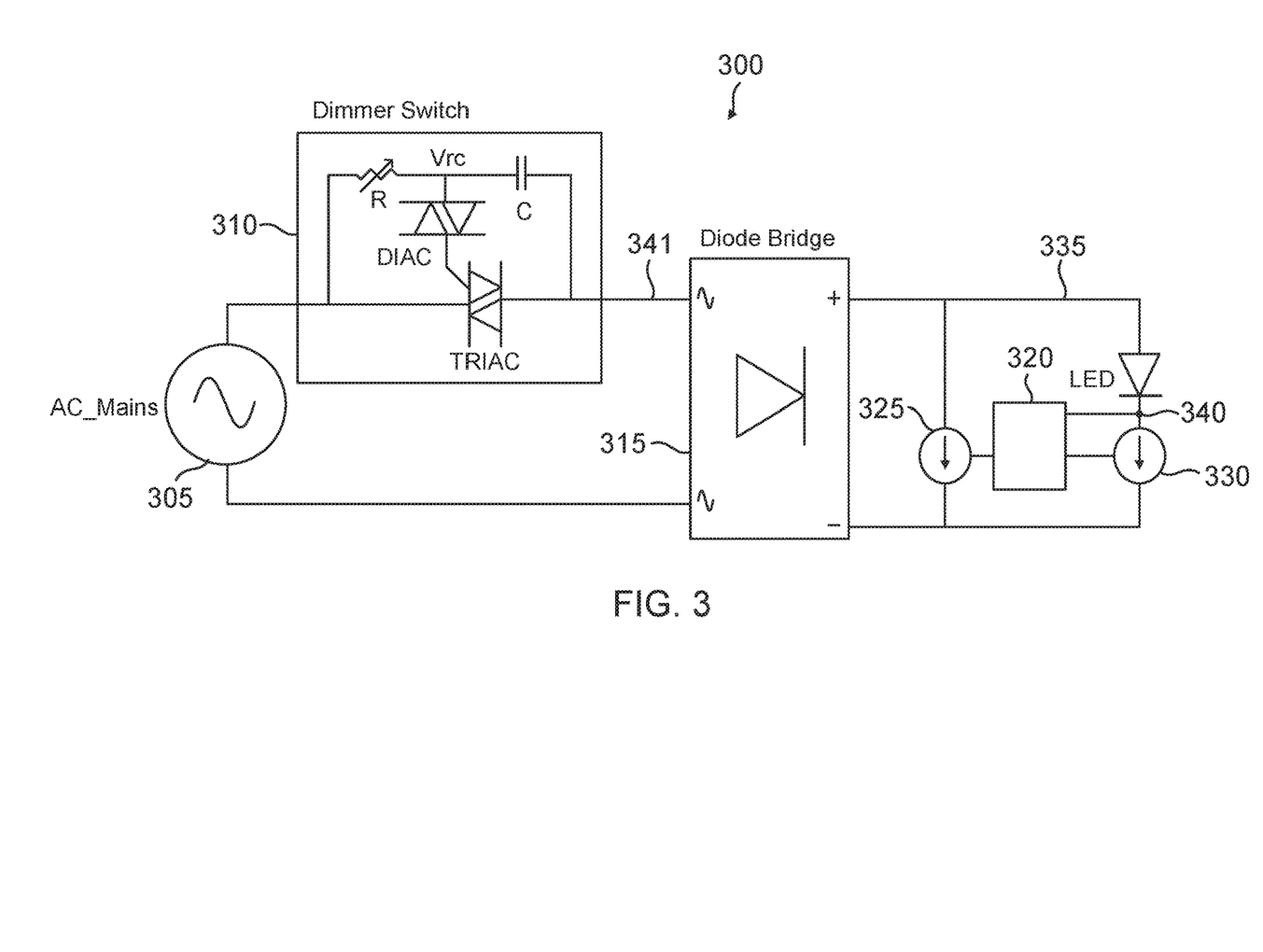
FIG. 3 is a diagram of a direct AC LED lighting device system with improved bleeder circuit efficiency in accordance with an aspect of the disclosure.

To better appreciate this bleeder circuit control for increased LED efficiency, consider an example direct AC lighting device system 300 having improved bleeder circuit efficiency as shown in FIG. 3. An AC mains 305 drives a leading edge dimmer switch 310 that in turn drives a diode bridge rectifier 315. Diode bridge rectifier 315 rectifies a phase cut voltage from dimmer switch 310 to produce a post diode bridge voltage carried on a power rail 335. When the post diode bridge voltage exceeds an LED threshold voltage for an LED, an LED current will conduct from power rail 335 through the LED as controlled by an LED current source 330 controlled by a controller 320. Controller 320 also controls a bleeder circuit current source 325 to conduct a bleed current from power rail 335 into ground.

Figure 4:
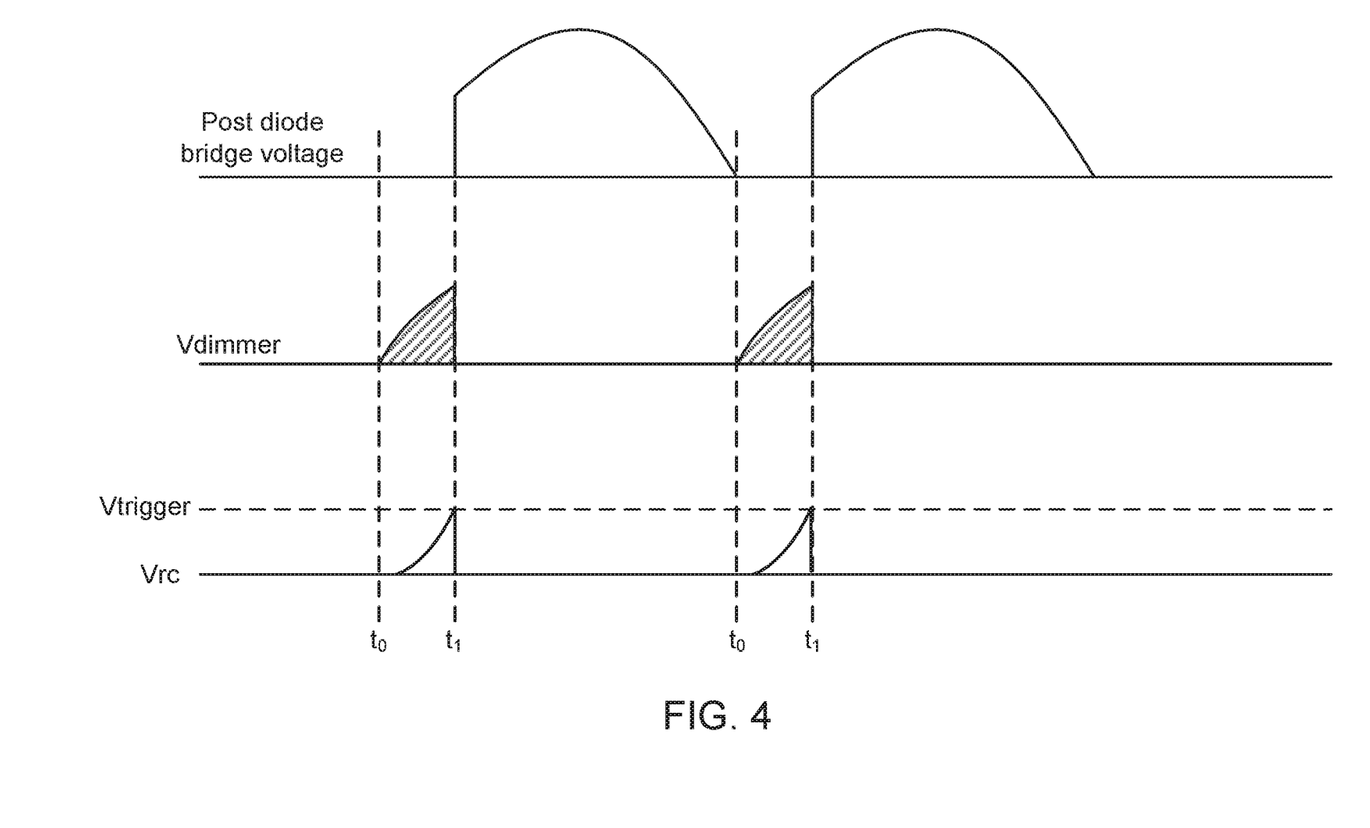
FIG. 4 illustrates some additional waveforms for the conventional direct AC LED device system of FIG. 1.

A TRIAC in dimmer switch 310 does not conduct until triggered by a DIAC having a capacitor C and a variable resistance R. The node between the capacitor C and variable resistor R carries an RC circuit voltage Vrc. Depending upon a voltage difference between the AC mains voltage and a voltage for a pre-diode-bridge node 341, RC circuit voltage Vrc will reach a triggering threshold to trigger the TRIAC to conduct. For example, consider the voltage waveforms of FIG. 4 for a conventional direct AC lighting device system. A zero crossing for the post diode bridge voltage occurs at a time t0. Since the TRIAC is not conducting at this time, the post diode bridge voltage remains discharged while a voltage difference (Vdimmer) across the dimmer switch increases as the AC mains voltage rises. As Vdimmer rises, the RC circuit voltage Vrc rises until it equals a triggering voltage Vtrigger at a time t1. The TRIAC is thus triggered to conduct at time T1 so that post diode bridge voltage has a rising edge at this time. This cycle of events is repeated starting at the subsequent zero crossing at a time t2.

Figure 5:
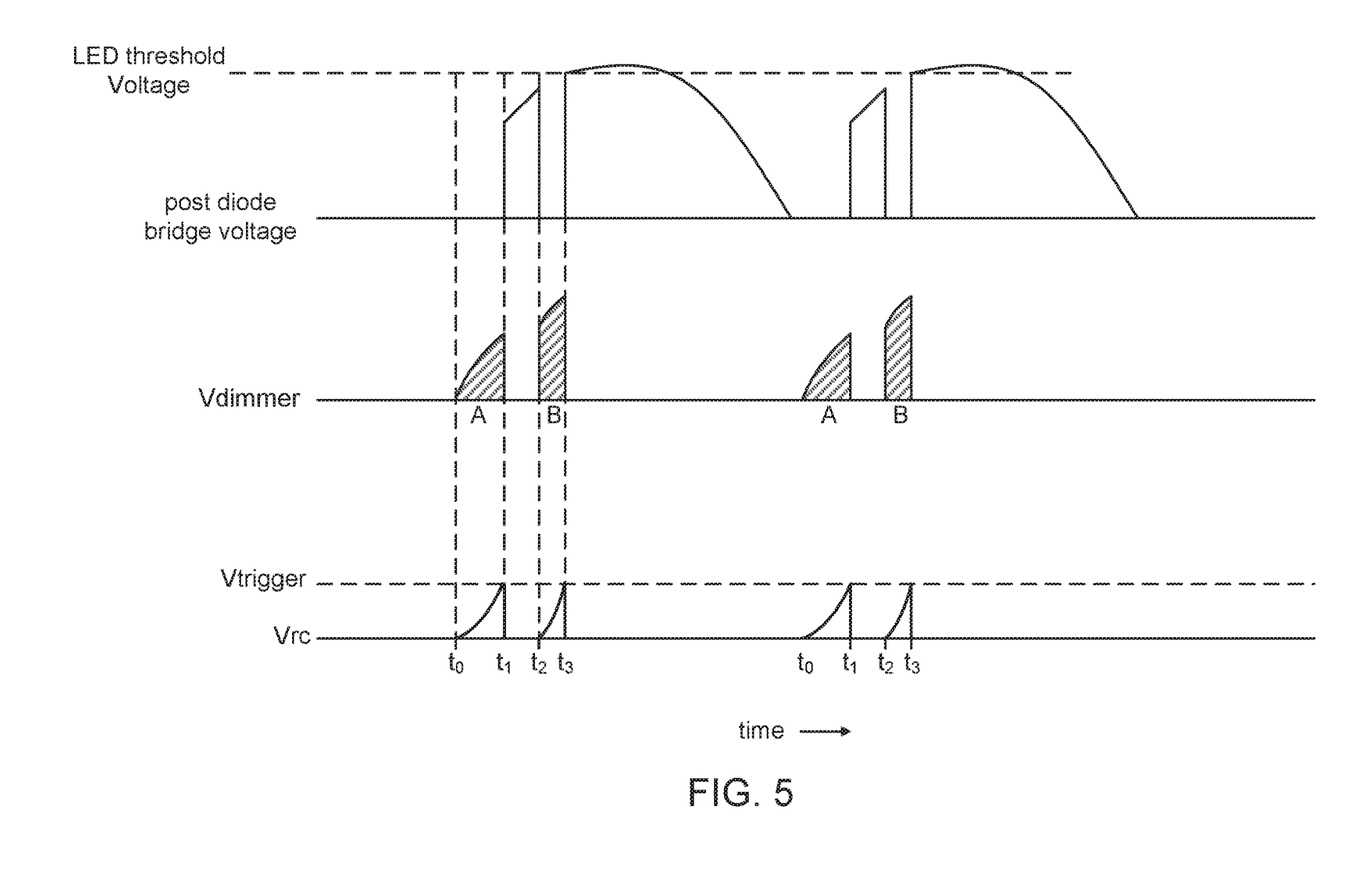
FIG. 5 illustrates some waveforms for the direct AC LED lighting device system of FIG. 3 in accordance with an aspect of the disclosure.

The amount of charge required to charge the RC circuit voltage Vrc until it reaches the triggering voltage Vtrigger is substantially equal to the integration of the voltage difference Vdimmer across the dimmer switch from time t0 to time t1. The controller disclosed herein advantageously exploits this known area to determine the timing of the discharge period for the post diode bridge voltage. Some example waveforms for system 300 are shown in FIG. 5. From the zero crossing at time t0 to time t1, the voltage difference Vdimmer across the dimmer switch develops as discussed with regard to FIG. 4 so that the RC circuit voltage Vrc in dimmer switch 310 rises to its triggering voltage at a time t1. The post diode bridge voltage thus has a rising edge at time t1. Controller 320 (FIG. 3) switches off bleeder circuit current source 325 at time t1 so that the TRIAC resets. Although the TRIAC is not conducting such that the post diode bridge voltage is floating after time t1, the post diode bridge voltage continues to rise with the sinusoidal increase of the AC mains voltage due to the internal capacitance of dimmer switch 310. Controller 320 then switches on bleeder circuit current source 325 at a time t2 of FIG. 4 to begin the discharge period for the post diode bridge voltage. The discharge of the post diode bridge voltage causes the voltage difference Vdimmer across dimmer switch 310 to have a rising edge at time t2 and rise according to the sinusoidal increase of the AC mains voltage. The RC circuit voltage Vrc thus rises above its triggering voltage for a second time at a time t3. But at time t3, the post diode bridge voltage has exceeded the LED threshold voltage such that controller 320 switches off bleeder circuit current source 325 at time t3. The resulting bleeder circuit power loss is thus confined between times t2 and t3 such that bleeder circuit efficiency is greatly improved as compared to the conventional bleeder circuit power loss discussed with regard to FIG. 2.

As discussed with regard to FIG. 3, an integration of the voltage Vdimmer from time t0 to time t1 is proportional to the amount of charge required to charge the RC circuit voltage Vrc to the triggering voltage. The resulting integration is represented by area A in FIG. 5. A similar integration of the voltage Vdimmer from time t2 to time t3 is designated as area B in FIG. 5. But area B is substantially equal to area A since both areas are proportional to the triggering charge for the RC circuit in the DIAC circuit. Controller 320 may thus readily determine time t2 such that area B is sufficient to trigger the TRIAC conduction at a time t3 when the post diode bridge voltage satisfies the LED threshold voltage.

By switching on bleeder circuit current source 325 to discharge the post diode bridge voltage at time t2, controller 320 ensures that when the TRIAC switches on at time3, the post diode bridge voltage will have just satisfied the LED threshold voltage so that the LED current will maintain the minimum holding current to keep the TRIAC from resetting. With regard to determining time t2 to switch on bleeder circuit current source 325 to discharge the post diode bridge voltage, note that if time t2 occurs too early, the bleeder circuit will waste energy as it conducts to keep the TRIAC from resetting until the post diode bridge voltage finally crosses the LED threshold voltage. Conversely, if time t2 occurs too late, the LED conduction time is being reduced unnecessarily.

Figure 6:
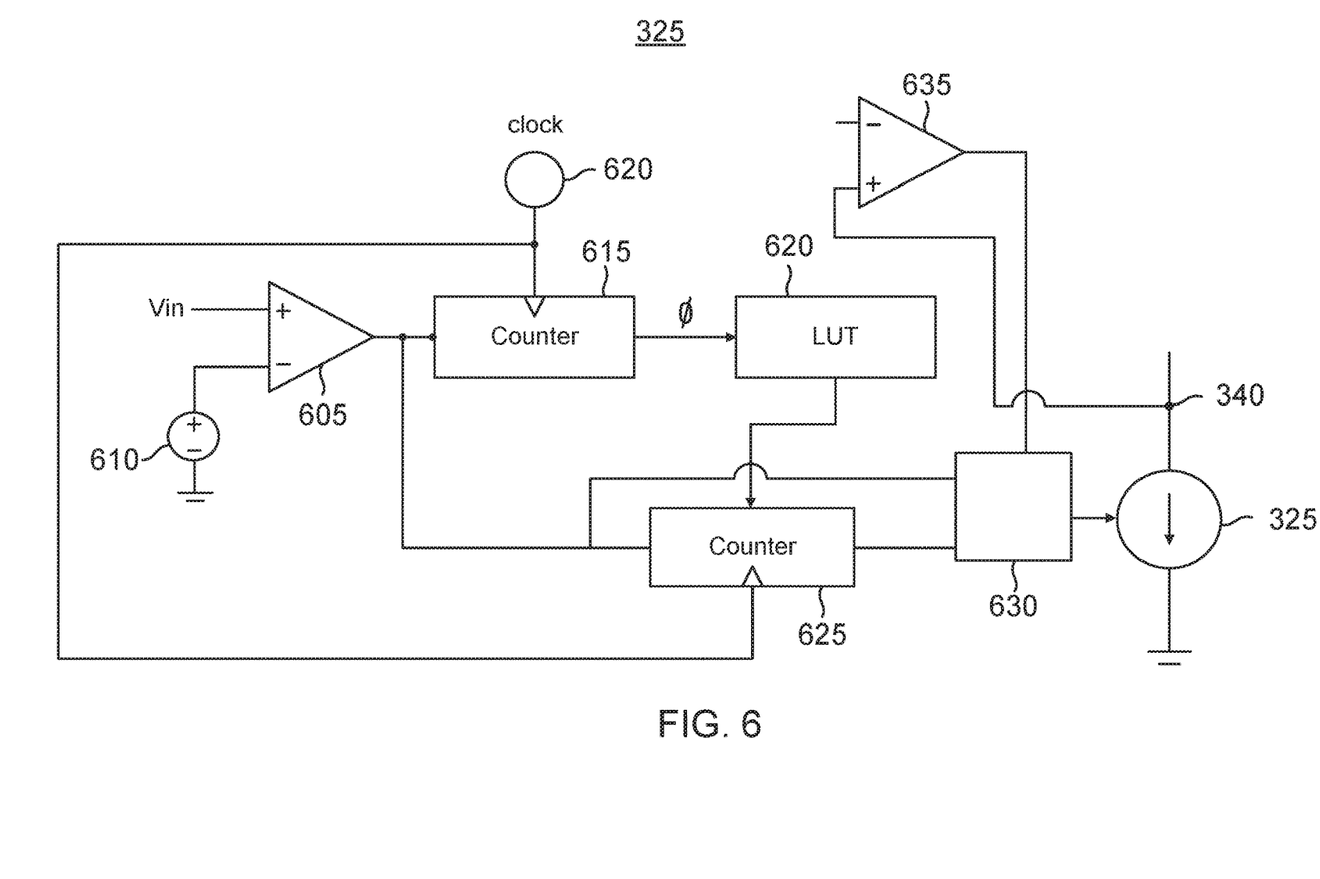
FIG. 6 is a circuit diagram of an example controller for the direct AC LED lighting device system of FIG. 3 in accordance with an aspect of the disclosure.

With regard to calculating the opportune time t2 to switch on bleeder circuit current source 325, note that the area A in FIG. 3 cannot be known a priori since it depends upon a user's setting of the variable resistance in the DIAC within LE dimmer switch 310. Controller 320 thus needs a means to determine the phase angle (dimmer setting) that corresponds to area A of FIG. 3. In particular, controller 320 may measure the time elapsed from the zero crossing at time t0 until the rising edge for the post diode bridge voltage at time t1. Since controller 320 knows the sinusoidal behavior for the post diode bridge voltage and also measures the period from time t0 to time t1, the area A is known. For example, controller 320 may be configured as shown in FIG. 6. A comparator 605 compares the post diode bridge voltage (designated as Vin) to a relatively small positive voltage such as 0.1 V from a voltage source 610. The output of comparator 605 will thus go low at the zero crossing for Vin at time t0 and will go high at the rising edge for Vin at time t1. To measure the phase angle φ (time elapsed between time t0 and time 1, a first counter 615 is triggered to count cycles of a clock signal from a clock source 620 in response to a low output from comparator 605. Counter 615 is configured to stop counting in response to a high output from comparator 605 such that counter 615 counts from time t0 to time t1 to estimate the phase angle φ as a count of the elapsed time from time t0 to time t1. A lookup table (LUT) 625 receives the count from counter 615 to estimate area A (which is also the area B) discussed with regard to FIG. 5. Since the voltage Vin is sinusoidal, the area under its curve is readily estimated by LUT 625 responsive to the count from counter 615. LUT sets a count for a second counter 630 that counts responsive to rising edge for Vin as determined by a high output from comparator 605.

A logic circuit 635 controls bleeder circuit current source 325 responsive to the output from comparator 605 and second counter 630. For example, logic circuit 635 is configured to switch on bleeder circuit current source 325 at time t0 in response to the output from comparator 605 going low. Conversely, logic circuit 635 is configured to switch off bleeder circuit current source 325 at time t1 in response to the output from comparator 605 going high. When triggered by counter 625, logic circuit 635 then switches on bleeder circuit current source 325 at time t2 to begin the discharge period for the voltage Vin (the post diode bridge voltage). Finally, logic circuit 635 is further configured to switch off bleeder circuit current source 325 in response to the voltage Vin satisfying the LED threshold voltage. To make this determination, controller 320 may respond to the voltage of a node 340 between the LED and LED current source 330. The voltage of node 340 will rise as the post diode bridge voltage satisfies the LED threshold voltage. Referring again to FIG. 6, controller 320 may thus include a comparator 640 that determines when the voltage of node 340 is greater than a threshold voltage (e.g., a small positive voltage) to determine whether the LED threshold voltage is satisfied. Logic circuit 635 is further configured to respond to the LED threshold voltage being satisfied such as detected by comparator 640 to switch off bleeder circuit current source 325. The LED current control is not shown in FIG. 6 since this control is conventional. Referring again to FIG. 3, bleeder current source 325, LED current source 330, and controller 320 may be integrated into a single integrated circuit.

Figure 7:
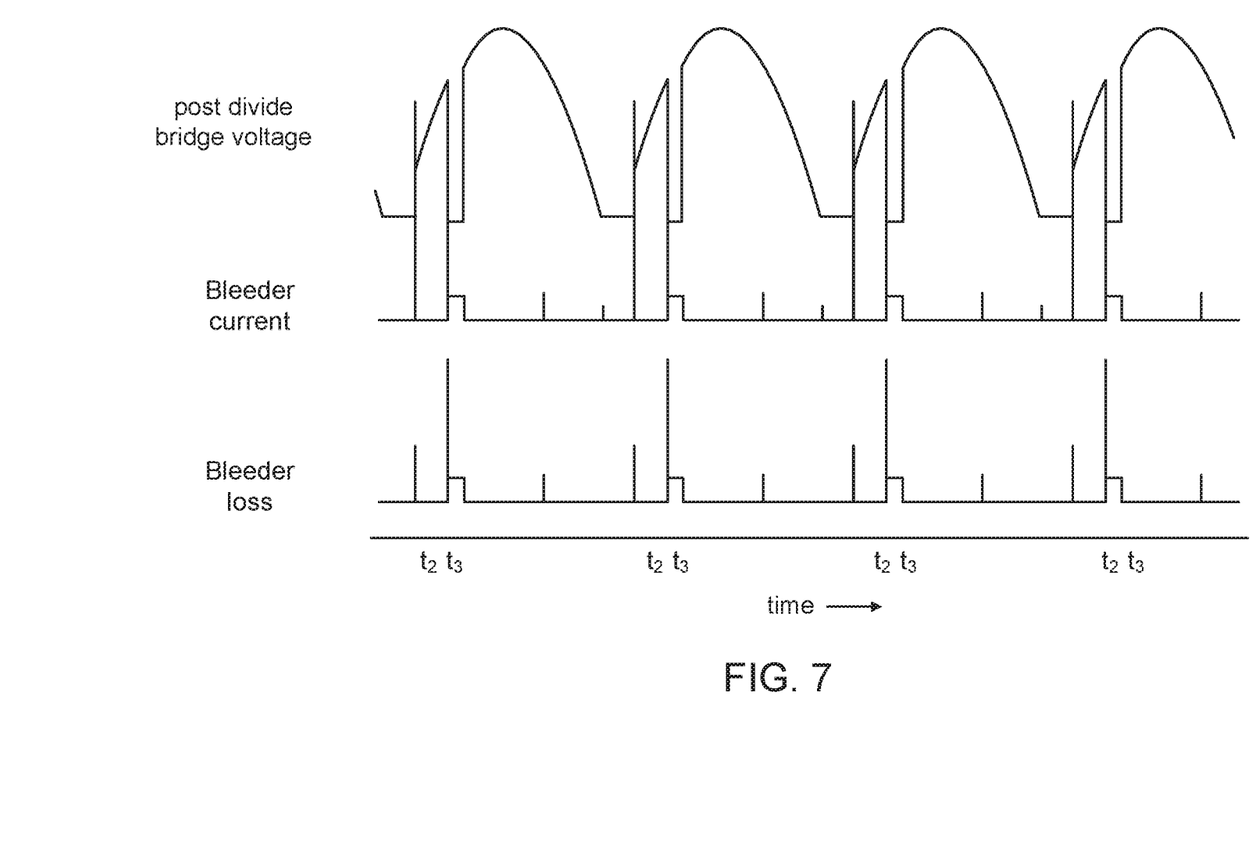
FIG. 7 illustrates the post diode bridge voltage, bleeder current, and bleeder circuit loss waveforms for the direct AC LED lighting device of FIG. 3.

The resulting bleeder circuit loss is shown in FIG. 7. The bleeder circuit loss is confined between times t2 and t3 discussed with regard to FIG. 5 in each cycle of the post diode bridge voltage. A comparison to the conventional bleeder circuit loss discussed with regard to FIG. 2 shows the dramatic increase in bleeder circuit efficiency.

As those of some skill in this art will by now appreciate and depending on the particular application at hand, many modifications, substitutions and variations can be made in and to the materials, apparatus, configurations and methods of use of the devices of the present disclosure without departing from the scope thereof. In light of this, the scope of the present disclosure should not be limited to that of the particular embodiments illustrated and described herein, as they are merely by way of some examples thereof, but rather, should be fully commensurate with that of the claims appended hereafter and their functional equivalents.

We claim:

1. A direct AC LED lighting device, comprising:
   a bleeder circuit;
   an LED controller configured to switch on the bleeder circuit prior to an initial rising edge for a post diode bridge voltage and configured to switch off the bleeder circuit for a delay period responsive to the initial rising edge for the post diode bridge voltage to force a TRIAC in a leading edge dimmer to reset and no longer conduct current, wherein the LED controller is further configured to again switch on the bleeder circuit for a discharge period prior to the post diode bridge voltage equaling an LED threshold voltage to discharge the post diode bridge voltage, wherein the discharge period has a duration sufficient to trigger a conduction of current in the TRIAC to cause the post diode bridge voltage to have a second rising edge, the controller being further configured to switch off the bleeder circuit at a termination of the discharge period.

2. The direct AC LED lighting device of claim 1, wherein the LED controller includes a comparator configured to detect a first conduction of current for the TRIAC through a detection of the initial rising edge in the post diode bridge voltage.

3. The direct AC LED lighting device of claim 2, wherein the LED controller further includes a first counter that counts responsive to a clock signal to count to the discharge of the post diode bridge voltage after the detection of the initial rising edge in the post diode bridge voltage.

4. The direct AC LED lighting device of claim 3, further comprising:
a lookup table configured to lookup a count for the first counter responsive to a period between a zero crossing for the post diode bridge voltage and the initial rising edge for the post diode bridge voltage.

5. The direct AC LED lighting device of claim 3, further comprising:
a logic circuit configured to respond to the comparator and the first counter to control an on state and an off state for the bleeder circuit.

6. The direct AC LED lighting device of claim 1, further comprising:
an LED current source, wherein the LED controller is further configured to control an LED current conducted through an LED following the discharge period.

7. The direct AC LED lighting device of claim 1, further comprising:
a power rail for carrying the post diode bridge voltage, wherein the bleeder circuit is coupled between the power rail and ground.

8. The direct AC LED lighting device of claim 7, wherein the bleeder circuit comprises a bleeder circuit current source.

9. A method of controlling a bleeder circuit in a direct AC lighting device, comprising:
measuring a first time delay between a zero crossing and a subsequent rising edge for a post diode bridge voltage to estimate a triggering voltage for a leading edge dimmer switch;
switching off the bleeder circuit responsive to the subsequent rising edge for the post diode bridge voltage to force a TRIAC in the leading edge dimmer switch to reset and stop conducting;
determining a second time delay responsive to the estimate of the triggering voltage for the leading edge dimmer switch; and
following an expiration of the second time delay following the subsequent rising edge of the post diode bridge voltage, switching on the bleeder circuit to trigger the TRIAC to conduct again, wherein determining the second time delay comprises integrating a sinusoidal increase for the post diode bridge voltage from the zero crossing to the subsequent rising edge.

10. The method of claim 9, further comprising:
comparing the post diode bridge voltage to a positive threshold voltage to detect the zero crossing and the subsequent rising edge for the post diode bridge voltage.

11. The method of claim 10, further comprising counting a count responsive to a cycles of a clock signal to measure the first time delay.

12. The method of claim 9, wherein integrating the sinusoidal increase for the post diode bridge voltage comprises looking up a value from a lookup table.

13. The method of claim 12, wherein determining the second time delay comprises counting a cycles of a clock signal until a count is reached equaling the value from the lookup table.

14. The method of claim 9, further comprising:
switching off the bleeder circuit responsive to the post diode bridge voltage exceeding an LED threshold voltage.

15. The method of claim 14, further comprising:
controlling an LED current conducted through an LED after the post diode bridge voltage exceeds the LED threshold voltage.

* * * * *

UNITED STATES PATENT AND TRADEMARK OFFICE
CERTIFICATE OF CORRECTION

PATENT NO. : 10,405,392 B1
APPLICATION NO. : 15/954554
DATED : September 3, 2019
INVENTOR(S) : Nan Shi and Haiju Li It is certified that error appears in the above-identified patent and that said Letters Patent is hereby corrected as shown below:

In the Specification

In Column 2, Line 33, delete "jitter".

Signed and Sealed this
Fourteenth Day of April, 2020

Andrei Iancu
*Director of the United States Patent and Trademark Office*